(12) United States Patent
Légaré

(10) Patent No.: US 6,400,802 B1
(45) Date of Patent: Jun. 4, 2002

(54) METHOD AND APPARATUS FOR PERFORMING TRANSMISSION LINE TESTING

(75) Inventor: Christian Légaré, Verdun (CA)

(73) Assignee: Minacom International Inc., Montreal (CA)

( * ) Notice: Subject to any disclaimer, the term of this patent is extended or adjusted under 35 U.S.C. 154(b) by 0 days.

(21) Appl. No.: 09/523,074

(22) Filed: Mar. 10, 2000

(30) Foreign Application Priority Data

Mar. 12, 1999 (CA) .............................................. 2265388

(51) Int. Cl.7 ............................. H04M 1/24; H04M 9/08
(52) U.S. Cl. ..................... 379/3; 379/1.01; 379/9.06; 379/22; 379/27.01; 379/29.01; 379/33.04
(58) Field of Search .............................. 379/1, 3, 22, 24, 379/26, 27, 29, 339, 406, 407, 410, 411

(56) References Cited

U.S. PATENT DOCUMENTS 5,008,923 A * 4/1991 Kitamura et al. ............... 379/3
5,530,724 A * 6/1996 Abrams et al. ............. 379/345

* cited by examiner

*Primary Examiner*—Binh Tieu
(74) *Attorney, Agent, or Firm*—Ladas & Parry

(57) ABSTRACT

A method and apparatus for testing and measuring transmission line parameters, such as the post-dial delay, the line rate, the noise level and the signal level, among others. The method comprises the step of enabling an echo canceler present in the transmission line and afterwards measuring the parameters of the line.

14 Claims, 6 Drawing Sheets

METHOD AND APPARATUS FOR PERFORMING TRANSMISSION LINE TESTING

FIELD OF THE INVENTION

The present invention relates to the field of quality testing in telecommunication networks. More specifically, it pertains to a method and apparatus for testing and measuring transmission line parameters, such as the post-dial delay, the line rate, the noise level and the signal level, among others.

BACKGROUND OF THE INVENTION

Within the Public Switched Telephone Network (PSTN), test and measurement systems are required to remotely and automatically test the network transmission lines, in order to monitor the quality of service provided by the network. Such systems are commonly referred to as Transmission Impairment Measurement Systems (TIMS). Standard, existing TIMS use dedicated originating and terminating devices to take the necessary measurements, whereby the TIMS user is required to control both ends of the circuit being tested.

The evolution of the telecommunication industry has brought about deregulation and globalization within the industry, where providers and vendors of telecommunication services are expanding their product and service offerings to gain market share in this new environment. A proliferation of new telecommunication carriers is emerging and it is now less likely that a particular carrier will own, and thus be in a position to control, a particular network circuit under test from end-to-end. In addition, a new trend is appearing whereby carriers are transiting via other carriers within a single telecommunication network.

Regardless of the changes affecting the telecommunication networks, the testing and measurement of the network transmission line parameters continues to be an important requirement, as quality assurance is and always will be an ongoing issue. Within a particular telecommunication network, an originating carrier would like to be able to evaluate the service level provided for by its new suppliers, over the various circuits in use. Unfortunately, existing TIMS' may not be able to provide this evaluation capability, due to their dependence on both an originating and a terminating dedicated for performing the transmission line measurements and tests.

The background information herein clearly shows that there exists a need in the industry to provide an improved method and apparatus for testing and measuring transmission line parameters within a telecommunication network.

SUMMARY OF THE INVENTION

The invention provides a method for measuring a certain parameter of a voice transmission line including an echo canceler, said method comprising:
  enabling said echo canceler; and
  applying a signal to the transmission line to measure the certain parameter.

The invention is particularly useful in measuring at least one parameter of a voice transmission line that includes an echo canceler. Normally, echo cancelers are designed to acquire a disabled mode when they detect a signal on the transmission line of the type that could be used to effect measurements. Typically, such signal may be a digital signal issued by a modem. When the echo canceler is disabled, the measurements taken do not reflect the true behavior of the transmission line when a voice signal is transmitted over it.

The present invention provides a method and an apparatus to enable the echo canceler so as to be able to effect more meaningful measurements.

As embodied and broadly described herein, the invention provides a measuring device for measuring a certain parameter of a voice transmission line including an echo canceler and a terminating device, the terminating device and said measuring device being capable of establishing a data communicative relationship by exchanging data over the voice transmission line, the echo canceler being capable of acquiring an enabled mode and a disabled mode, in the enabled mode the echo canceler performing echo cancellation on the voice transmission line, when in the disabled mode, the echo canceler being responsive to the terminating device and said measuring device co-acquiring first and second signal conditions, respectively to acquire the enabled mode, the terminating device manifesting a predetermined pattern of signal variations that includes the first signal condition, said measuring device including a signal processing unit coupled to the transmission line and being operative for:
  observing said predetermined pattern of signal variations manifested by said terminating device and for establishing on the transmission line said second signal condition at a point in time such that the first and second signal conditions occur over a common time period, such that the echo canceler acquires the enabled mode; and
  measuring the certain parameter.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

Figure 1:
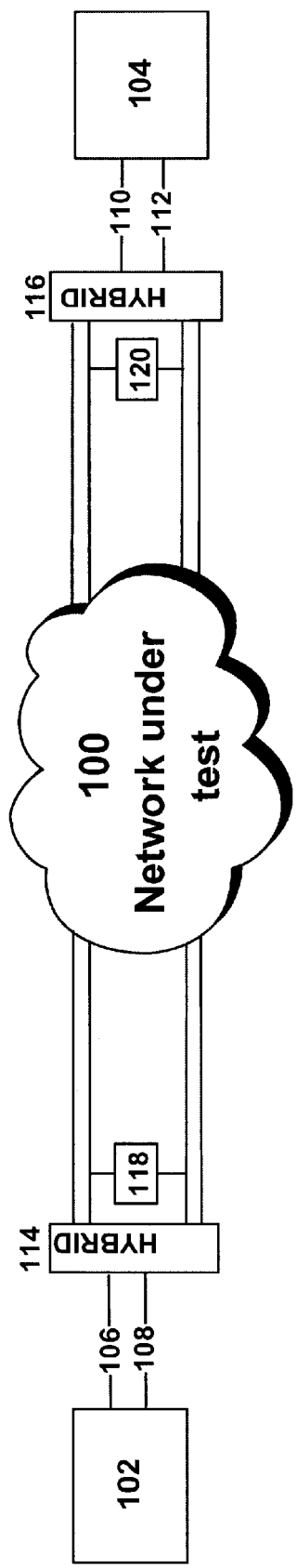
FIG. 1 is a block diagram of a test and measurement system as applied to a telecommunication network, embodying the principles of the present invention.

FIG. 1 illustrates a telecommunication network 100 under test, where the network 100 comprises a multitude of transmission lines and the network transmission line parameters may be tested and measured. Examples of such transmission line parameters include link type, post-dial delay, call set-up, ring duration, round trip delay, line rate, near-end echo, far-end echo, signal level, noise level and Signal-to-Noise Ratio (SNR).

In a most preferred embodiment of the present invention, the test and measurement system comprises a dedicated measuring device 102 at an originating end of the transmission line (hereinafter referred to "originating device"), having an input (receiver) 106 for receiving signals from the network 100 and an output (transmitter) 108 for transmitting signals to the network 100. Further, the test and measurement system includes a terminating device 104 implemented by a standard network access device, such as a high-speed modem or fax, previously established as a publicly accessible component within the telecommunication network 100. The terminating device 104 also includes an input (receiver) 110 for receiving signals from the network 100 and an output (transmitter) 112 for transmitting signals to the network 100. It is important to note that the terminating device 104 is not a dedicated device as in existing TIMS, and thus is not necessarily owned or controlled by the originating carrier.

A common issue within telecommunication networks is the echo that arises as a result of transmitted signals being coupled into a return path and fed back to the respective sources. The most common cause of the coupling is an impedance mismatch at a four-wire to two-wire hybrid. This typical configuration is represented in FIG. 1 by hybrids 114 and 116. The impedance mismatches cause signals in the incoming branch of a four-wire circuit to get coupled into the outgoing branch and return to the source. A standard form of echo control is echo cancellation. Echo cancelers 118 and 120 operate by modeling the echo path to subtract a properly delayed and attenuated copy of a transmitted signal from the receive signal to attenuate (cancel) echo components. Generally, echos are canceled close to the source so that delays in the echo canceler are minimized. Since the concept of echo cancellation and the functionality of echo cancelers have been well documented and are well known to those skilled in the art, they will not be described in further detail.

In a specific example, the dedicated originating device 102 uses the techniques developed for V.34 modems to perform many of the required network transmission line measurements, while the standard network access device called by the originating device 102 and acting as the terminating device 104 is itself a V.34 device. Further, the device 102 is based on standard V.34 hardware where firmware has been modified to provide for the remaining measurements necessary for an accurate testing of a PSTN transmission line within the telecommunication network 100. The V.34 modem operates at data signaling rates of up to 33 600 bit/s, and is designed for use on the general switched telephone network and on leased point-to-point 2-wire telephone-type circuits. For further details concerning the V.34 modem, the telecommunication standardization sector of the International Telecommunication Union (ITU) has published a standards specification with respect to V.34 data communication over the telephone network, specifically *ITU-T Recommendation V.34* (October 1996). This document is incorporated herein by reference.

Figure 6:
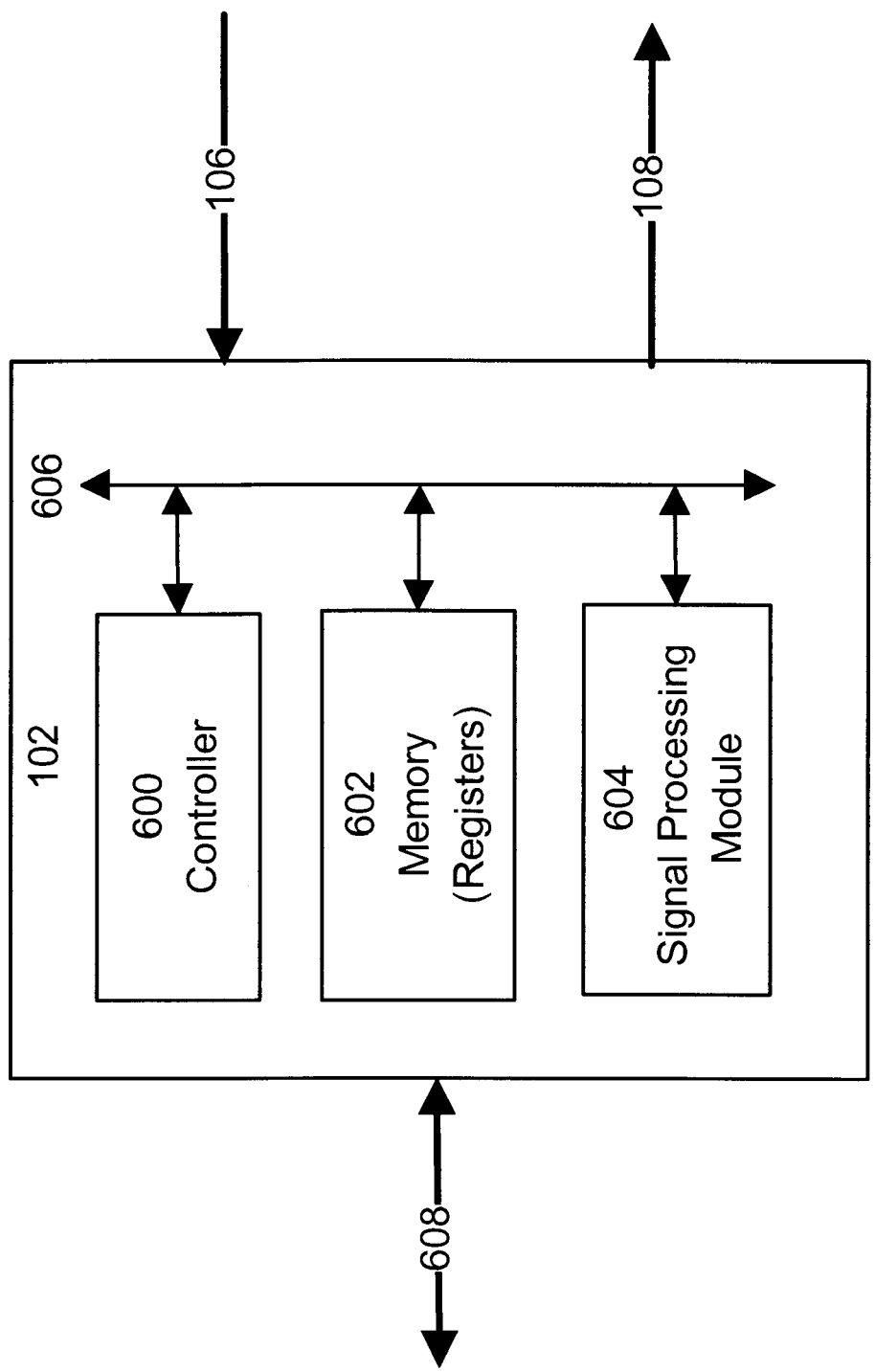
FIG. 6 is a structural block diagram of the measuring device for the test and measurement system shown in FIG. 1.

FIG. 6 is a block diagram of the basic structure behind the originating device 102, comprising a controller 600, a memory 602 and a signal-processing module 604. The signal-processing module 604 is responsible for performing the necessary modulation techniques and signal conditioning required of high-speed modems. In the case of the V.34 modem, the module 604 generally comprises Digital Signal Processing (DSP) circuitry of the type known in the art. The memory 602 comprises a set of registers for storing different variables and measurement values. Thus, the transmission line measurements evaluated by the test and measurement system are stored, as well as variables affecting the device 102 operation. A local bus 606 provides for the exchange of data between the controller 600, the memory 602 and the DSP 604, while control port 608 allows for the exchange of data from and to an external device, for example the CPU of a computer, not shown in FIG. 6. In particular, once the transmission line measurements have been taken and stored within the registers of memory 602, the control port 608 provides an output channel by which such measurements can be transmitted to a user of the test and measurement system. In the specific example where control port 608 connects to the CPU of a computer, a directive message may be generated by the computer and sent to the originating device 102 requesting transmission of the stored measurements. The measurements are then transmitted via control port 608 from the originating device 102 to the computer CPU, at which point they may be displayed for the system user via some form of peripheral device, such as a computer monitor or a printer.

The memory 602 further contains a program element that controls the operation of the device 102. That program element is comprised of instructions that are executed by the controller 600 for implementing different procedures to be effected by the device 102, for example procedures in response to particular directive messages received at the control port 608.

In the case of the above example, the dedicated originating device 102 is actually a modified V.34 modem, transmitting at a nominal transmit power level of −11 dBm with a frequency stability of ±0.01%. The originating device 102 is responsible for recording the level of any signal received from the terminating device 104, which also has a nominal transmit power level. The originating device 102 has a receiver 106 sensitivity of −43 dBm under worst case conditions and an AGC dynamic range of 43 dB. The test and measurement system formed by the dedicated originating device 102 and the terminating device 104 evaluates the network transmission line parameters by implementing a 4-phase procedure based on the V.34 modem recommendations. The four phases will be described below, including brief definitions of the phase-related signals used by the test and measurement system to effect communication between the originating device 102 and the terminating device 104.

1. Phase 1—Network Interaction

Phase 1 of the test and measurement procedure comprises the initialization between the dedicated originating device 102 and the terminating device 104, for setting up the receiver circuit and for establishing the desired mode of operation. All signals in Phase 1 are transmitted at the nominal transmit power level. The signals exchanged between the two devices during Phase 1 may include:

1.1 ANS

ANS is an answer tone transmitted from the called end (terminating device 104). The answer tone is an uninterrupted 2100±15 Hz tone at a level of −12±6 dBm with a duration, except when truncated, of 3.3±0.7 seconds. Where it is intended to disable network echo cancelers, the ANS tone will include continued phase reversals. Normally, modems are specifically designed to disable echo cancelers and such disabling action is expected to occur in the interaction described hereinafter. The reversal in phase is accomplished such that the phase is within 180±10 degrees in 1 ms and the amplitude of the answering tone is not more than 3 dB below its steady state value for more than 400 us. Generally, ANS is associated with faxes and low-speed modems.

1.2 ANSam

ANSam is a modified answer tone transmitted from the called end, and consists in a sine wave signal at 2100±1 Hz with phase reversals at an interval of 450±25 ms, amplitude-modulated by a sine wave at 15±0.1 Hz. The modulated envelope ranges in amplitude between 0.8±0.01 and 1.2±0.01 times its average amplitude. Generally, ANSam is associated with high-speed modems.

1.3 CI

CI is a call indicator signal, and is transmitted from the calling end (originating device 102) with a regular ON/OFF cadence. The ON periods are not less than 3 periods of the CI sequence, and not greater than 2.0 seconds in duration; the OFF periods are not less than 0.4 seconds and not greater than 2.0 seconds in duration. A CI sequence consists of ten 1s followed by ten synchronization bits and the call function octet.

1.4 CT

CT is the calling tone transmitted from the calling end (originating device 102). It consists of a series of interrupted 1300±15 Hz signals (bursts): ON for a duration of not less than 0.5 seconds and not more than 0.7 seconds and OFF for a duration of not less than 1.5 seconds and not more than 2.0 seconds.

1.5 CNG

CNG is a calling tone for indicating a non-speech terminal.

1.6 CM

CM is a call menu signal, transmitted from the calling end (originating device 102) to indicate modulation modes available in the originating device. It consists of a repetitive sequence of bits at 300 bit/s.

1.7 JM

JM is a joint menu signal, transmitted from the called end (terminating device 104) to indicate modulation modes available jointly in both the originating and terminating devices. It consists of a repetitive sequence of bits at 300 bit/s.

1.8 CJ

CJ is a signal that acknowledges the detection of a JM signal and indicates the end of a CM signal. CJ consists of three consecutive octets of all 0s with start and stop bits.

Figure 2:
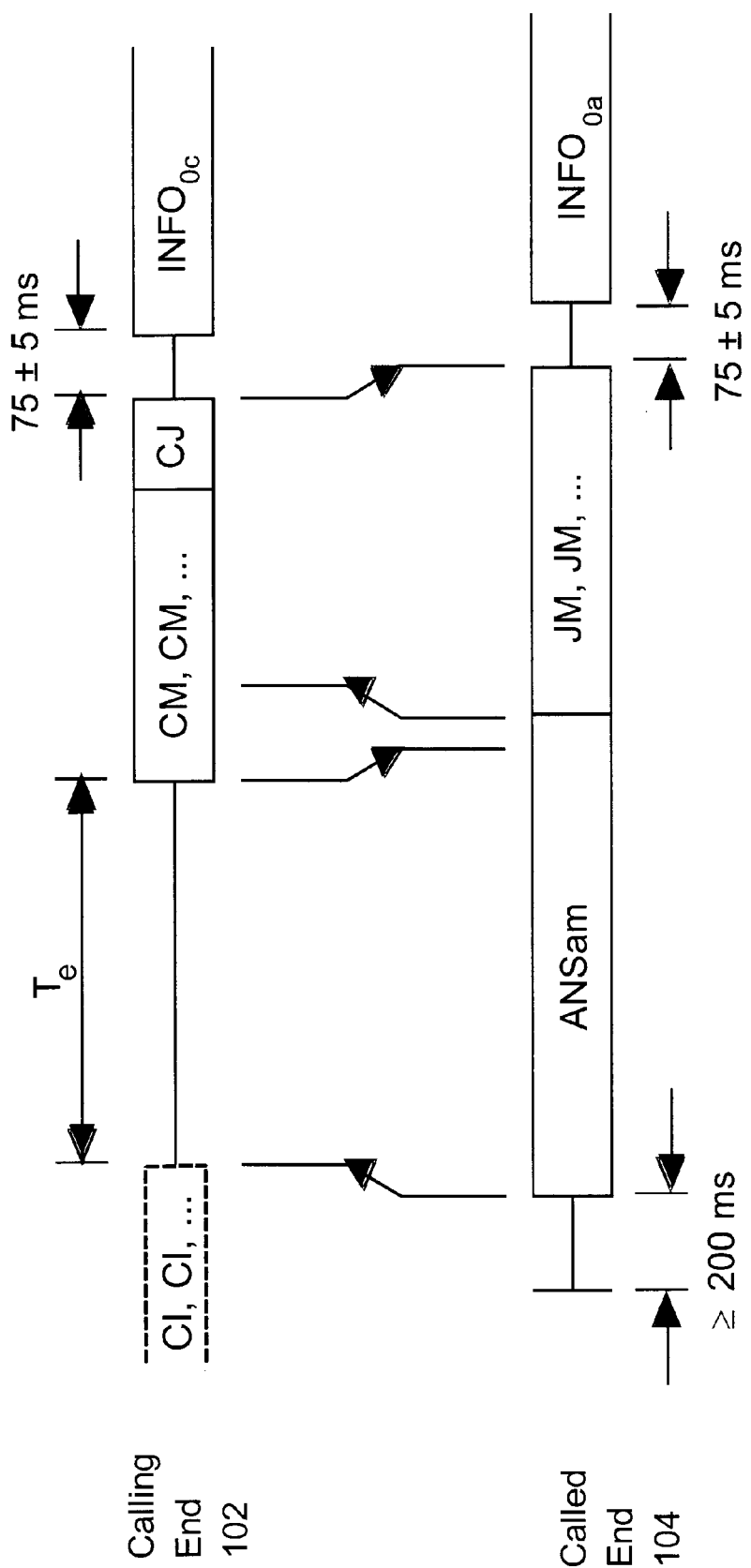
FIG. 2 illustrates the signal flow during Phase 1 of the test and measurement procedure implemented by the system shown in FIG. 1.

The signal flow that occurs during Phase 1 is illustrated in FIG. 2. Initially, the originating device 102, also referred to as the calling device, conditions its receiver 106 to detect either signal ANS or ANSam and transmits signal CI, CT or CNG via transmitter 108. If the signal ANSam is detected, the calling device 102 transmits silence for a period T. This silent period T allows for the disabling of network echo-control equipment, as normally performed by high-speed modems so that the transmission channel is initialized for a data call, as opposed to a voice call. The calling device 102 next conditions its receiver 106 to detect the JM signal, and transmits its calling menu signal CM (a message containing a list of the features supported by the calling device) with the appropriate bits set in the modulation modes category to indicate that V.34 operation is desired. The answering device 104 replies with a joint menu signal JM (a list of features supported by both devices). When a minimum of two identical JM sequences have been received, the calling device 102 completes the current CM octet and sends signal CJ. Finally, the calling device 102 transmits silence for 75±5 ms and proceeds with Phase 2. The exchange of signals $INFO_{0c}$ and $INFO_{0a}$ is a part of Phase 2.

Note that if the calling device 102 detects signal ANS (rather than ANSam), the device will proceed in accordance with the appropriate recommendations (possibly V.32bis or T.30). These protocols handle the lower speed modems and fax machines.

2. Phase 2—Probing and Ranging

Phase 2 of the test and measurement procedure comprises the channel probing and ranging necessary to evaluate the network transmission line parameters. Note that during Phase 2, all signals except L1 are transmitted at the nominal transmit power level. The signals exchanged between the two devices during Phase 2 may include:

2.1 A

Tone A is a 2400 Hz tone transmitted by the called device 104. Transitions between A and $\overline{A}$, and similarly between $\overline{A}$ and A, are 180 degree phase reversals in the 2400 Hz tone. During the transmission of A and $\overline{A}$, the called device 104 sends a 1800 Hz guard tone without any phase reversals. Tone A is transmitted at 1 dB below the nominal transmit power while the guard tone is transmitted at the nominal transmit power.

NOTE—The bandwidth of a tone with phase reversals should not be constrained in a way that appreciably affects the accuracy of round trip delay measurements.

2.2 B

Tone B is a 1200 Hz tone transmitted by the calling device 102. Transitions between B and $\overline{B}$, and similarly between $\overline{B}$ and B, are 1800 degree phase reversals in the 1200 Hz tone.

NOTE—The bandwidth of a tone with phase reversals should not be constrained in a way that appreciably affects the accuracy of round trip delay measurements.

2.3 INFO Sequences

INFO sequences are used to exchange device capabilities, results of line probing, and data mode modulation parameters. Two sets of INFO sequences are used: ($INFO_{0a}$, $INFO_{0c}$) and ($INFO_{1a}$, $INFO_{1c}$), where "a" identifies INFO sequences sent by the called device 104 (answer device), and "c" identifies INFO sequences sent by the calling device. Both sets of INFO sequences consist in sequences of bits, where the different information represented by specific bits within the sequences is clearly defined in the above mentioned ITU-T Recommendation V.34. Thus, the INFO sequences will not be described in further detail.

2.4 Line Probing Signals

Line probing is a method for determining channel characteristics by sending periodic signals that are analyzed by a probe. In the case of the modified V.34 modem as the originating device 102, a technique similar to the 23-Tone test developed in some existing Transmission Impairment Measurement Systems (IEEE Std 743-1984 and IEE Std 743-1995) is used to perform the line probing. The 23-tone test makes a variety of transmission impairment measurements across the full channel spectrum of the transmission line in a short period of time. In the present invention, the line probing technique applied yields the measurements of Signal Level, Noise Level, Signal to Noise Ratio (SNR), Far End Echo and Near End Echo.

Two line probing signals, L1 and L2, are used to analyze channel characteristics. L1 is a periodic signal with a repetition rate of 150±0.01% Hz which consists of a set of tones (cosines) spaced 150 Hz apart at frequencies from 150 Hz to 3750 Hz. Tones at 900 Hz, 1200 Hz, 1800 Hz, and 2400 Hz are omitted. The initial phase of each cosine is given in Table 1 below. The phase relationships of the tones create a signal that simulates the probability density of high-speed modems. L1 is transmitted for 160 ms (24 repetitions) at 6 dB above the nominal transmit power level. L2 is the same as L1 but is transmitted for no longer than 550 ms plus a round trip delay at the nominal transmit power level.

NOTE—The probing tones should be generated with enough accuracy so as not to appreciably affect the channel distortion and noise measurements in the remote receiver.

Figure 3:
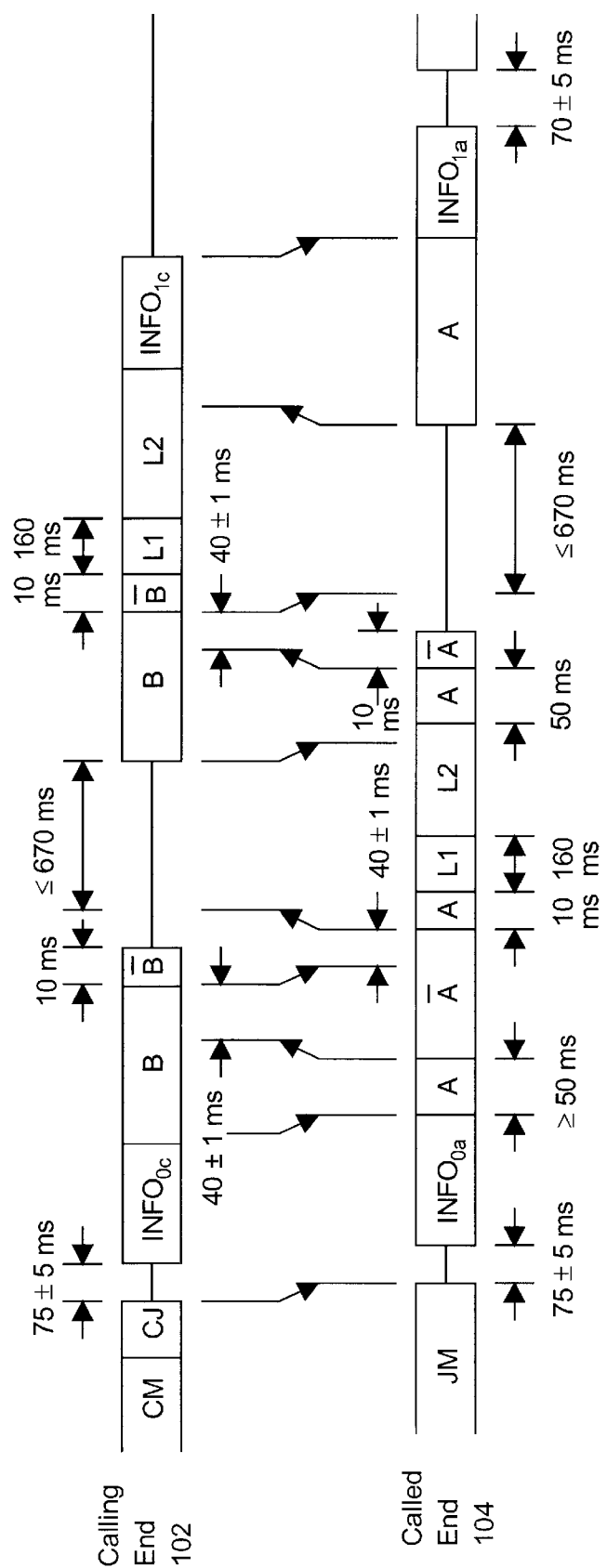
FIG. 3 illustrates the signal flow during Phase 2 of the test and measurement procedure implemented by the system shown in FIG. 1.

The signal flow that occurs during Phase 2 is illustrated in FIG. 3. During the 75±5 ms silent period ending Phase 1, the calling device 102 conditions its receiver 106 to receive $INFO_{0a}$ and detect Tone A. After the 75±5 ms silent period, the calling device 102 sends $INFO_{0c}$, followed by Tone B. After receiving $INFO_{0a}$, the calling device 102 conditions its receiver 106 to detect Tone A and the subsequent Tone A phase reversal. After detecting the Tone A phase reversal, the calling device transmits a Tone B phase reversal. The Tone B phase reversal is delayed so that the time duration between receiving the Tone A phase reversal at the line terminals and the appearance of the Tone B phase reversal at the line terminals is 40±1 ms. Tone B is transmitted for another 10 ms after the phase reversal. The calling device 102 next transmits silence and conditions its receiver 106 to detect a second Tone A phase reversal.

TABLE 1

Probing tones
$\cos(2\pi ft + \phi)$

| f(Hz) | φ (degrees) |
|---|---|
| 150 | 0 |
| 300 | 180 |
| 450 | 0 |
| 600 | 0 |
| 750 | 0 |
| 1050 | 0 |
| 1350 | 0 |
| 1500 | 0 |
| 1650 | 180 |
| 1950 | 0 |
| 2100 | 0 |
| 2250 | 180 |
| 2550 | 0 |
| 2700 | 180 |
| 2850 | 0 |
| 3000 | 180 |
| 3150 | 180 |
| 3300 | 180 |
| 3450 | 180 |
| 3600 | 0 |
| 3750 | 0 |

Figure 4:
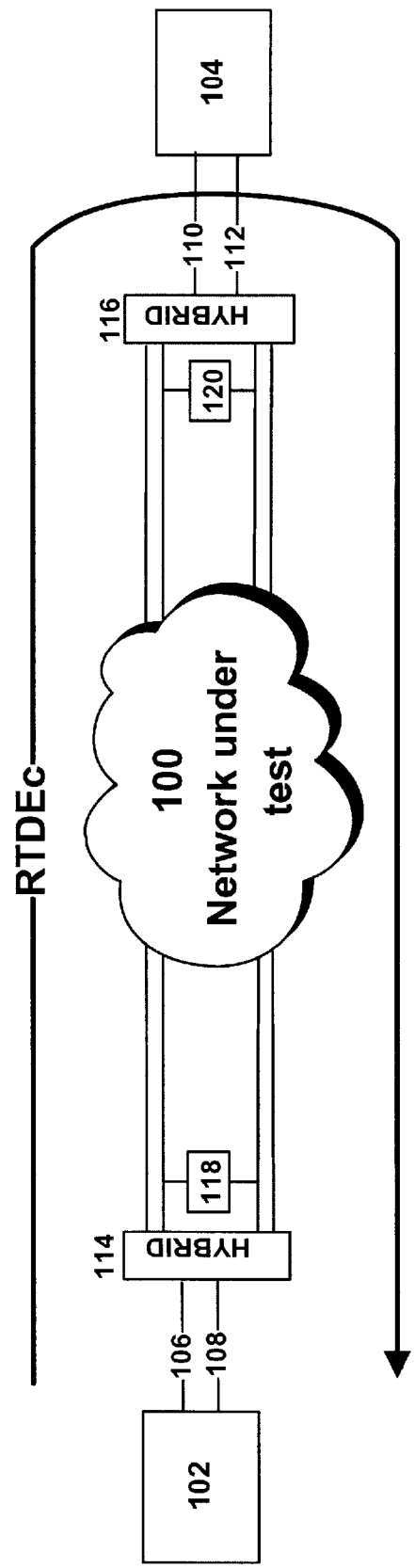
FIG. 4 illustrates the round trip delay measurement, as measured by the system shown in FIG. 1.

After detecting the second Tone A phase reversal, the calling device 102 can calculate the round trip delay, schematically illustrated by FIG. 4. The Round Trip Delay Estimate (RTDEc) is the time interval between the appearance of the Tone B phase reversal at the device line terminals and the receipt of the second Tone A phase reversal at the line terminals minus 40 ms. The calling device 102 next conditions its receiver 106 to receive the probing signals L1 and L2. Note that while either the calling device 102 or the called device 104 is receiving the probing signals, the respective device is taking all the appropriate transmission line measurements.

The calling device 102 receives signal L1 for its 160 ms duration. The calling device 102 then receives signal L2 for a period of time not exceeding 500 ms. Next, the calling device 102 transmits Tone B and conditions its receiver 106 to detect Tone A and the subsequent Tone A phase reversal. After detecting Tone A and the subsequent Tone A phase reversal, the calling device 102 transmits a Tone B phase reversal. The Tone B phase reversal is delayed so that the time duration between the receipt of the Tone A phase reversal at the line terminals and the appearance of the Tone B phase reversal at the line terminals is 40±1 ms. Tone B is transmitted for an additional 10 ms after the phase reversal. The calling device 102 then transmits signal L1 followed by signal L2 and conditions its receiver 106 to detect Tone A.

Once signal L2 has been sent, a first echo is received back at the calling device 102. Due to the proximity of the first impedance mismatch (hybrid 114), this first echo delay is very short. The level of the first echo is evaluated by the originating device 102 and reported as Echo Level Near, expressed in units of dBm. After having measured the first echo, the calling device 102 waits for a period of time not to exceed 550 ms plus a round trip delay. The second impedance mismatch (hybrid 116) is located at the far end of the circuit under test. It takes approximately a round trip delay for the second echo to appear at the calling device 102 terminals. The level of this second echo is also evaluated by the originating device 102 and reported as Echo Level Far, expressed in units of dBm.

Once the calling device 102 detects Tone A and has received the local echo of L2 for a period of time not exceeding 550 ms plus a round trip delay, the line probing is completed and the originating and terminating devices can exchange the results that they each gathered. These results include measurements such as the Signal Level, the Noise Level and the SNR. Thus, the calling device 102 sends $INFO_{1c}$. After sending $INFO_{1c}$, the calling device 102 transmits silence and conditions its receiver 106 to receive $INFO_{1a}$. After receiving $INFO_{1a}$, the calling device 102 proceeds to Phase 3 of the test and measurement procedure.

Phase 3—Equalizer and Echo Canceler Training &
Phase 4—Final Training

During Phase 3 of the test and measurement procedure, both the dedicated originating device 102 (modified V.34 modem) and the terminating device 104 (standard network access V.34 device) train their respective equalizer and echo canceler through the exchange of various signals (particular bit sequences). Most high-speed modems, such as the V.34 modem, require automatically adjustable equalization to compensate for the phase distortion in a typical connection, where the transmission channel characteristics change with each such connection. Training of an automatic equalizer is required to determine the characteristics of the transmission channel, by measuring the response to known test signals. Next, equalizing circuitry in the receiver of the modem is adjusted (and continually adjusted during transmission) to provide compensation for the amplitude and phase distortions in the channel. Training of the echo canceler is required to determine how much delay and attenuation is needed to simulate the echo characteristics of the circuit. Since echo canceler training and equalizer training are both documented and well known to those skilled in the art, they will not be described in further detail.

Final training of the originating device 102 is performed during Phase 4 of the test and measurement procedure, as well as the final exchange of data mode modulation parameters. Specifically, Modulation Parameter (MP) sequences are exchanged between the originating device 102 and the terminating device 104, each sequence containing modulation parameters to be used for data mode transmission, such that data signaling rates (i.e. Line Rate) can be determined.

The signals exchanged between the two V.34 devices during Phases 3 and 4, as well as the actual signal flow that occurs during each Phase, will not be described in further detail as these are clearly defined and explained in the ITU-T Recommendation V.34 and are generally well known to those skilled in the art.

Thus, using this 4-phase procedure, the test and measurement system can evaluate and characterize the network transmission line used for a high-speed data call. As mentioned earlier, in normal operation, high-speed modems, such as the V.34 modem, disable the Echo Canceler (E/C) so as to characterize the transmission line for a data call. All tests and measurements taken by the above-described 4-phase procedure are performed with the E/C disabled. Consequently, the resulting measurements obtained from the channel probing and ranging are valid strictly for a data call, but do not accurately reflect the transmission line characteristics for a voice call. In order to evaluate the same parameters for a voice call, the E/C has to be re-enabled.

Generally, once an echo canceler has been disabled, it will hold in disabled mode until a signal dropout occurs over the transmission line. Specifically, the echo canceler will be re-enabled when a signal in the band from 200 to 3400 Hz having a level of −36 dBm or less is detected over the transmission line. In order to minimize the impairment due to accidental speech disabling, the signal dropout must be present over the transmission line for a minimum time period of 250±150 ms, hereafter referred to as the pause time. Specific to the present invention, the test and measurement system provides an E/C control procedure for re-enabling the echo cancelers present on the transmission line. Thus, line probing of the transmission channel can be effected with all of the equipment present on the transmission line, as when a person-to-person phone call is being placed.

In a most preferred embodiment of the present invention, the E/C control procedure comprises establishing a selected signal condition at each end of the transmission line, the selected signal condition being muting all transmission over the line for a period of time greater than the pause time, whereby both the calling device 102 and the called device 104 are simultaneously mute. Since the test and measurement system has control of the originating device 102, muting of this modem transmitter for a fixed period of time can easily be affected. However, since the originating carrier does not control the terminating device 104, muting of this device can not be effected through direct manipulation of the terminating device 104.

Figure 5:
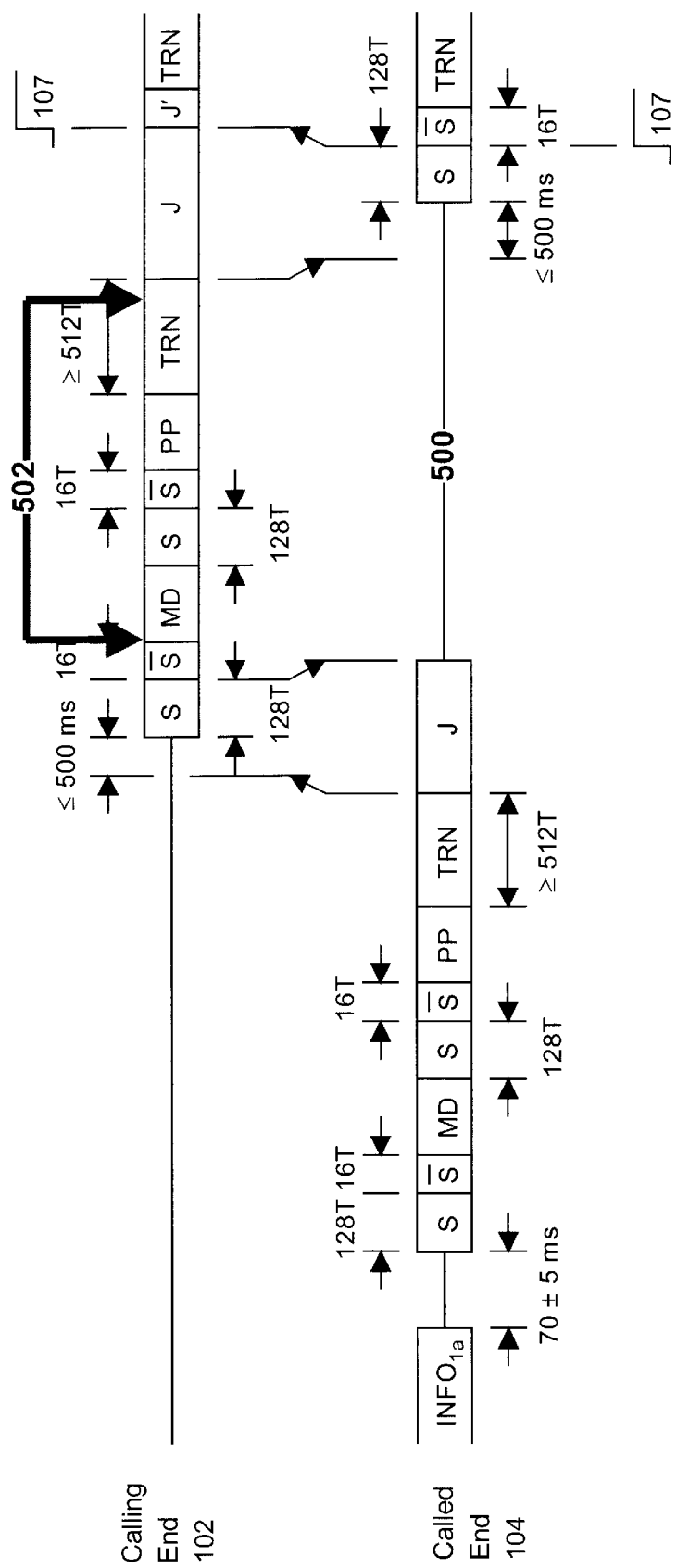
FIG. 5 illustrates the signal flow during Phase 3 of the test and measurement procedure implemented by the system shown in FIG. 1.

Continuing with the above example wherein the calling device 102 is a modified V.34 modem and the called device is itself a V.34 device, FIG. 5 illustrates the signal flow that occurs between the two devices during Phase 3 of the test and measurement procedure. As previously explained, the signals themselves, as well as the description of the signal flow, are clearly described in the ITU-T Recommendation V.34 and will not be described in further detail at this point. However, as shown in FIG. 5, it is important to note that once the called (terminating) device 104 receives signal S, followed by the S-to-$\bar{\text{s}}$ transition, it stops transmitting for a certain period of time 500. The called device 104 will not begin transmitting again until it receives signal J from the calling device 102. The E/C control procedure provided by the test and measurement system thus comprises muting the calling device 102 during Phase 3 of the test and measurement procedure. Specifically, the muting takes place anywhere between the S-to-$\bar{\text{s}}$ transition and the end of signal TRN, a period of time represented by window 502 in FIG. 5. The duration of the muting effected by the calling device 102 is determined by a setting in one of the device 102 registers, for example 500 ms. As a consequence of this muting of the calling device 102, the called device 104 will remain silent, given that signal J is never sent by the calling device 102. As per standard V.34 device recovery mechanisms (refer to ITU-T Recommendation V.34), the called device 104 will await signal J for 2600 ms plus two round trip delays before retraining. Note that both the modified V.34 modem and the V.34 terminating device can initiate and respond to a retrain procedure, whereby the test and measurement procedure is re-initiated starting with Phase 2 (Phase 1 is skipped, as the V.34 connection is already established between the two devices).

Thus, the E/C control procedure ensures that all transmission is muted over the transmission line for a period of time at least as great as the pause time, required to re-enable the echo cancelers. Upon a successful re-enabling of the echo cancelers, the transmission line characteristics for a voice call may be analyzed. Once this analysis is complete, the transmission line is returned to data mode (i.e. disabling of echo cancelers). In order to perform both the analysis and the return to data mode, the calling device 102 initiates the retrain procedure after muting the transmission over the line for the appropriate length of time. This retrain provides for line probing of the transmission line with the echo cancelers enabled (Phase 2), followed by a retraining of the echo cancelers and a return to data mode (Phases 3 and 4).

In a different example of the test and measurement system, the terminating device 104 may be something other than a high-speed V.34 data modem, for example a lower-speed data modem (i.e. V.32bis, V.32, V.22bis, Bell 212A) or even a fax with modem data rate of V.27, V.29 or V.17. In each case, the test and measurement system will proceed in accordance with the appropriate protocol.

In another embodiment of the present invention, other measurements related to PSTN behavior may be acquired, in addition to those measurements taken during the line probing phase of the test and measurement procedure, by adding new features to the dedicated originating device 102. Such features are implemented by different procedures, added to the program element stored in the memory 602 of the originating device 102, for execution by the controller 600. The additional measurements may include the PDD (time interval between the end of user or terminal equipment dialing and the reception of the appropriate network response), the call setup time (time between circuit seizure and the receipt of a network response or call-connected), the dial tone delay (time interval between off-hook and reception of dial tone) and ring duration (time interval between first ringback and the answer signal).

The above description of a preferred embodiment under the present invention should not be read in a limitative manner as refinements and variations are possible without departing from the spirit of the invention. The scope of the invention is defined in the appended claims and their equivalents.

What is claimed is:

1. A method for measuring a certain parameter of a voice transmission line including an echo cancellation device, the voice transmission line including a terminating device and an originating device being capable of establishing a data communicative relationship by exchanging data over the voice transmission line, the echo cancellation device being capable of acquiring an enabled mode and a disabled mode, in the enabled mode the echo cancellation device performing echo cancellation on the voice transmission line, in the disabled mode the echo cancellation device being responsive to the terminating device and the originating device co-acquiring first and second signal conditions, respectively, to acquire the enabled mode, the terminating device manifesting a predetermined pattern of signal variations that includes the first signal condition, said method comprising:

observing the predetermined pattern of signal variations manifested by the terminating device;

establishing at the originating device the second signal condition at a point in time whereby the first and second signal conditions occur over a common time period, such that the echo cancellation device acquires the enabled mode;

applying a signal to the transmission line to measure the certain parameter.

2. A method for measuring a certain parameter of a voice transmission line as defined in claim 1, wherein the echo cancellation device is responsive to co-acquisition of the first and second signal conditions during a minimal time period to acquire the enabled mode, the common time period having a duration at least equal to the minimal time period.

3. A method for measuring a certain parameter of a voice transmission line as defined in claim 1, wherein the first signal condition is absence of signal transmission by the terminating device.

4. A method for measuring a certain parameter of a voice transmission line as defined in claim 3, wherein the second signal condition is absence of signal transmission by the originating device.

5. A method for measuring a certain parameter of a voice transmission line as defined in claim 4, wherein the terminating device includes a modem.

6. A method for measuring a certain parameter of a voice transmission line as defined in claim 5, wherein the terminating device is a facsimile machine.

7. A method for measuring a certain parameter of a voice transmission line as defined in claim 1, wherein the certain parameter is selected from the group consisting of echo level, signal level, noise level, signal to noise ratio, round trip delay, ring duration, call set-up duration, post dial delay, call disposition status and link type.

8. A measuring device for measuring a certain parameter of a voice transmission line including an echo canceler and a terminating device, the terminating device and said measuring device being capable of establishing a data communicative relationship by exchanging data over the voice transmission line, the echo canceler being capable of acquiring an enabled mode and a disabled mode, in the enabled mode the echo canceler performing echo cancellation on the voice transmission line, when in the disabled mode, the echo canceler being responsive to the terminating device and said measuring device co-acquiring first and second signal conditions, respectively to acquire the enabled mode, the terminating device manifesting a predetermined pattern of signal variations that includes the first signal condition, said measuring device including a signal processing unit coupled to the transmission line and being operative for:

observing said predetermined pattern of signal variations manifested by said terminating device and for establishing on the transmission line said second signal condition at a point in time such that the first and second signal conditions occur over a common time period, such that the echo canceler acquires the enabled mode; and measuring the certain parameter.

9. A measuring device as defined in claim 8, wherein the echo canceler is responsive to co-acquisition of the first and second signal conditions during a minimal time period to acquire the enabled mode, the common time period having a duration at least equal to the minimal time period.

10. A measuring device as defined in claim 9, wherein the first signal condition is absence of signal transmission by the terminating device.

11. A measuring device as defined in claim 10, wherein said second signal condition is absence of signal transmission by said measuring device.

12. A measuring device as defined in claim 11, wherein the terminating device includes a modem.

13. A measuring device as defined in claim 12, wherein the terminating device is a facsimile machine.

14. A measuring device as defined in claim 8, wherein said certain parameter is selected in the group consisting of echo level, signal level, noise level, signal to noise ratio, round trip delay, ring duration, call set-up duration, post dial delay and link type.

* * * * *